Sept. 22, 1964      E. R. ZIEGLER      3,149,361
WINDSHIELD WIPER ARM
Filed March 7, 1960      2 Sheets-Sheet 1
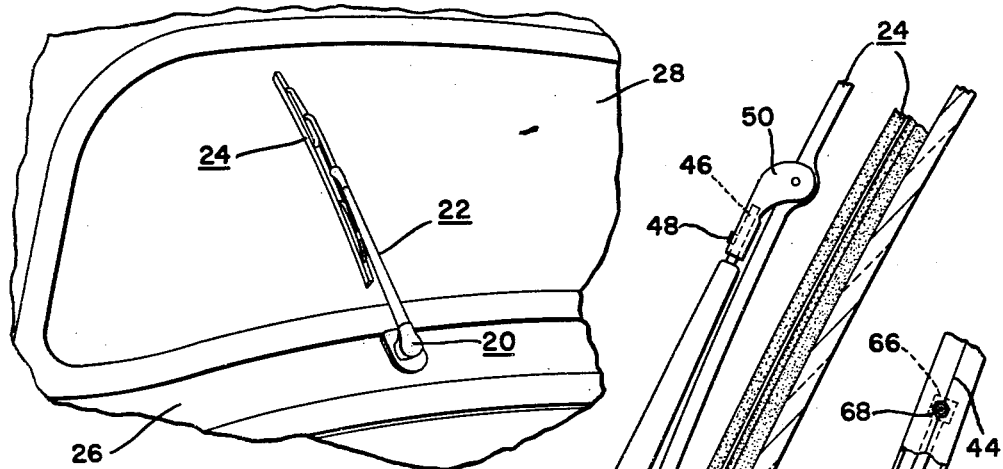
Fig. 1
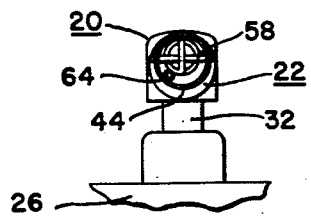
Fig. 4
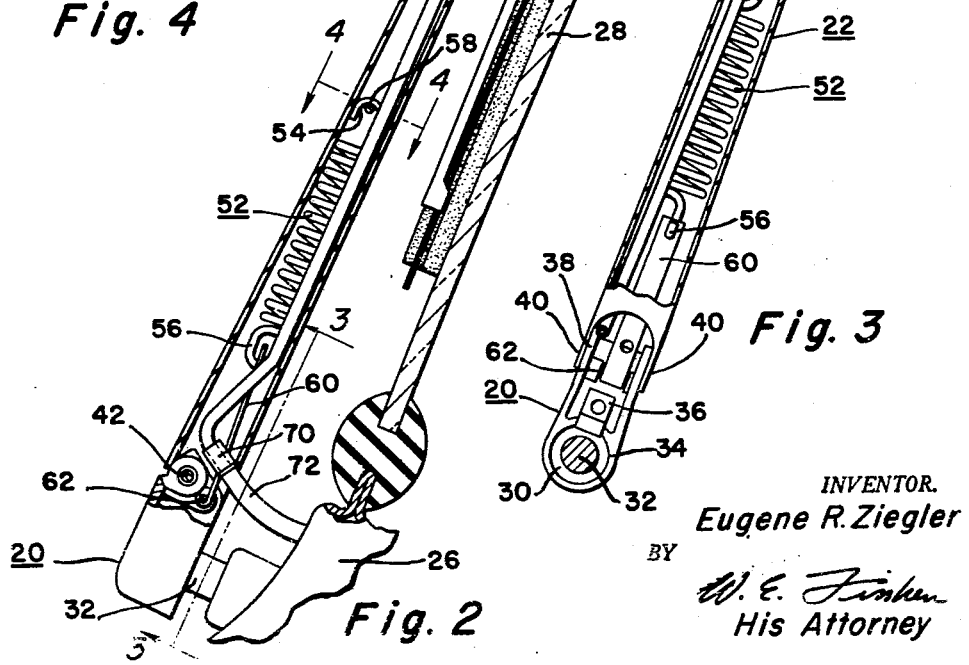
Fig. 3
Fig. 2
INVENTOR.
Eugene R. Ziegler
BY
His Attorney Sept. 22, 1964 E. R. ZIEGLER 3,149,361
WINDSHIELD WIPER ARM
Filed March 7, 1960 2 Sheets-Sheet 2

INVENTOR.
Eugene R. Ziegler
BY
*W. E. Finken*
His Attorney

United States Patent Office
3,149,361
Patented Sept. 22, 1964

1

3,149,361
WINDSHIELD WIPER ARM
Eugene R. Ziegler, Spencerport, N.Y., assignor to General Motors Corporation, Detroit, Mich., a corporation of Delaware
Filed Mar. 7, 1960, Ser. No. 12,993
2 Claims. (Cl. 15—250.35)

This invention pertains to the art of windshield cleaning, and particularly to improved wiper arm constructions.

With the advent of larger vehicle windshields which are sloped rearwardly, it has become necessary to use longer wiper arms and longer wiper blades to clean an adequate area of the windshield for proper vision. Thus, whereas only a few years ago wiper blades and arms having a length of twelve inches or less were used as standard equipment on vehicles, at the present time wiper blades and wiper arms having lengths in excess of fifteen inches are in common use, and it is reasonable to expect that in the future wiper arms and blades will have lengths up to eighteen inches. Conventional wiper arms having lengths up to twelve inches comprise an inner section adapted to be mounted on a pivot shaft and an outer blade carrying section spring hinge connected to the arm section for applying pressure to a wiper blade. In some instances, the outer blade carrying section comprises a channel-shaped sheet metal spring housing and a solid bar extension of rectangular cross-section securely attached to the channel-shaped spring housing by means of rivets. While wiper arms of this construction are satisfactory in lengths of twelve inches or less for use with wiper blades having lengths of twelve inches or less, this types of wiper arm construction does not have adequate torsional rigidity in lengths of fifteen to eighteen inches when used with blades of fifteen to eighteen inches in length. Twisting of the wiper arm is detrimental to proper cleaning of the windshield in several respects, namely in preventing the wiper blade from assuming the proper drag or squeegeeing angle and in permitting severe layover of the wiper blade so as to cause the metal portion thereof to scratch the surface of the windshield.

In order to obtain greater torsional rigidity in the outer section of the wiper arms, some wiper arms have been manufactured having a single channel-shaped outer section with a cover for enclosing the pressure applying spring. While arms having channel-shaped outer sections have greater torsional strength, and thus resist twisting to a greater extent than arms having two-piece outer sections as aforedescribed, these arms nevertheless twist when excessive loads are imposed on the wiper blade, such as when a wiper blade is moved across a tacky, or semi-wet windshield. The present invention relates to wiper arms wherein the outer sections are tubular thus eliminating the need for a separate spring cover, and greatly improving the torsional rigidity of the outer arm section. Accordingly, among my objects are the provision of an improved windshield wiper arm construction including a tubular outer section; the further provision of a windshield wiper arm including spring hinge connected inner and outer sections including retention means for the outer end of the pressure applying spring; and the still further provision of a windshield wiper arm including a tubular outer section made from flat stainless steel sheet or strip stock which is seam welded.

The aforementioned and other objects are accomplished in the present invention by forming a tapered seam welded tube with a pair of ears at the inner end and a solid straight end portion at the outer end having an abutment whereby the arm can be detachably connected to a bayonet-type wiper blade connector. Specifically, several embodiments of the improved wiper arm construction are disclosed herein, all of the embodiments including a die cast inner, or mounting, section having a socket recess for driving connection with a pivot shaft. The outer arm sections are of tapered tubular configuration having ears at the inner end arranged to straddle a radial projection on the mounting section and through which a pivot pin extends for pivotally interconnecting the inner and outer arm sections. The outer arm sections are composed of stainless steel sheet or strip stock which is rolled into a tapered tubular configuration and longitudinally seam welded. If desired, a washer tube having a nozzle may be incorporated in the tubular outer arm section.

In all embodiments the inner end of the pressure applying spring is attached to one end of a retainer, the other end of which is secured to a pin spaced from the pivot pin interconnecting the inner and outer arm sections. In one embodiment, the outer end of the pressure applying spring is retained in assembled relation by a transversely extending pin. In other embodiments, various types of hooks are carried by the outer end section to which the outer end of the pressure applying spring is attached.

Further objects and advantages of the present invention will be apparent from the following description, reference being had to the accompanying drawings, wherein preferred embodiments of the present invention are clearly shown, and wherein similar numerals depict similar parts throughout the several views.

In the drawings:

FIGURE 1 is a fragmentary view in elevation of a portion of a vehicle equipped with a wiper arm constructed according to this invention.

FIGURE 2 is an enlarged fragmentary view, partly in section and partly in elevation, of a wiper arm constructed according to one embodiment of this invention shown in combination with a windshield.

FIGURE 3 is a fragmentary sectional view taken along line 3—3 of FIGURE 2.

FIGURE 4 is a fragmentary sectional view taken along line 4—4 of FIGURE 2.

Figure 5:
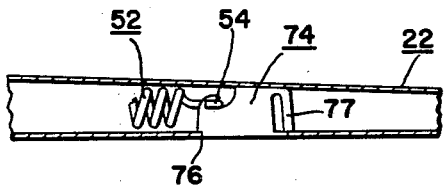
FIGURES 5 and 6 are fragmentary sectional views depicting modified hooks for the outer end of the pressure applying spring.

With particular reference to the drawings, this invention relates to wiper arms which carry wiper blades adapted to be oscillated across the outer surface of a windshield. As shown in FIGURE 1 the wiper arm includes a mounting section 20 and a blade carrying, or outer, section 22 spring hinge connected thereto about a transverse axis and carrying a conventional wiper blade 24. The mounting section 20 is adapted for driving connection to an oscillatory pivot shaft that projects through the cowl 26 of the vehicle so as to impart oscillatory movement to the wiper blade 24 across the outer surface of the windshield 28.

As seen in FIGURES 2 and 3, the mounting section 20 is adapted to be press fitted onto a drive head, or burr, 30 attached to an oscillatory pivot shaft 32. Accordingly, the mounting section 20 is formed with a socket recess 34 and carries a spring latch 36 adapted to engage the lower edge of the burr 30 so as to prevent accidental separation of the mounting section 20 from the burr 30. The mounting section 20 is formed with a channel-shaped radial extension 38 which is straddled by integral ears 40 of the outer arm section 22. A pivot pin 42 arranged transversely of the axis of the arm pivotally interconnects the inner and outer arm sections for movement toward and away from the associated windshield 28. The inner end of the outer arm section 22 in the vicinity of the ears 40 is channel-shaped whereas the intermediate portion of the outer arm section is of tapered tubular configuration having a substantially circular cross-section adjacent the inner end and an oval cross-section adjacent the outer end.

The outer section 22 is preferably made from stainless steel sheet or strip stock which is rolled into the tapered tubular configuration and seam welded on the lower side as indicated by numeral 44. The terminal end of the section 22 is formed as a solid section of substantially rectangular configuration as designated by numeral 46 and has an upstanding abutment 48 adapted to project through an aperture in a conventional bayonet-type wiper blade connector 50 attached to the wiper blade 24.

A tension spring 52 is used to urge the outer arm section 22 about the pivot 42 towards the associated windshield 28 for applying wiping pressure to the blade 24. The spring 52 has hooks 54 and 56 at its outer and inner ends, respectively. In the embodiment shown in FIGURES 2 through 4, the hook 56 engages a transversely extending pin 58 which extends through the intermediate portion of the outer arm section. Prior to assembling the spring 52 with the pin 58, the hook 56 is engaged with an aperture in an elongate connector 60. After the hook 54 is engaged with the pin 58, the connector 60 is hooked over a pin 62 extending between the side walls of the channelled section 38 of the mounting section as seen in FIGURES 2 and 3.

In some instances it may be desirable to install a nozzle and washer tube within the tubular outer section 22. This can conveniently be done by inserting a flexible tube 64 through the inner end of the outer arm section, tube 64 having a threaded fitting 66 at its outer end for receiving a threaded nozzle element 68 which extends through an opening in the inner side of the outer arm section. The inner end of the tube 64 can be connected by a coupling member 70 to a conduit 72 projecting through the cowl 26 of the vehicle. The orifice or orifices of the nozzle 68 may be arranged to discharge washing fluid onto the windshield in a general direction towards the terminal end of the wiper arm.

Tests have indicated that hollow stainless steel tubular outer arm sections have appreciably greater torsional rigidity than the bar and channel-type arm extensions heretofore manufactured. Accordingly, the amount of blade layover under extreme load conditions will not be excessive, and thus engagement between the metal superstructure of the blade and the windshield is precluded. In addition, the tubular outer arm sections have a pleasing appearance to the occupants of the vehicle.

With reference to FIGURE 5, a modified connector for the outer end of the spring 52 is disclosed. In this instance, the connector comprises a sheet metal hook 74 which is inserted through a slot 76 in the tubular arm section 22 with which the hooked end 54 of the spring can be engaged. The hook 74 has a resilient finger 77 in engagement with the inner walls of the tubular section for locking the hook 74 within the tubular section 22.

Figure 6:
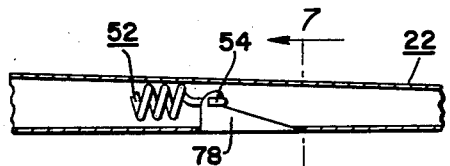
Figure 7:
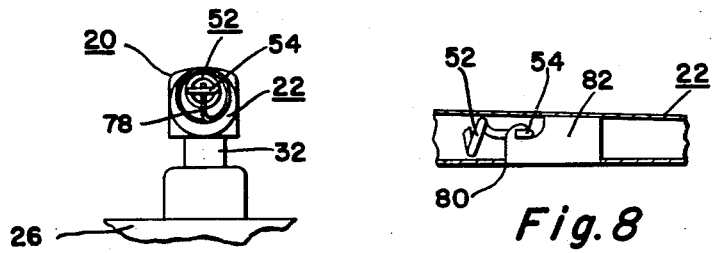
FIGURE 7 is a sectional view taken along line 7—7 of FIGURE 6.

With reference to FIGURES 6 and 7, the tubular outer arm section 22 is formed with an integral hook 78 which is bent upwardly between the abutting edges of the tubular section and about which the hooked end 54 of the spring 52 is engaged. In this embodiment, the hook 78 is bent upwardly prior to seam welding the abutting edges of the tubular section.

Figure 8:
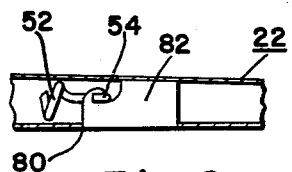
FIGURES 8 and 9 are fragmentary sectional views of modified spring hooks.

With reference to FIGURE 8, the tubular outer section 22 is formed with a slot 80 within which a hook 82 is inserted. The hook 82 may be welded to the tubular section 22 during the same welding operation, or separately welded thereafter. The hooked end 54 of the spring 52 is attached to the hook 82.

Figure 9:
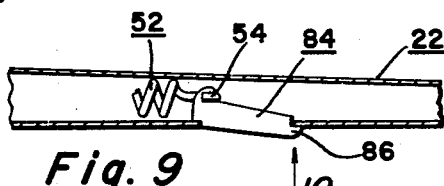
Figure 10:
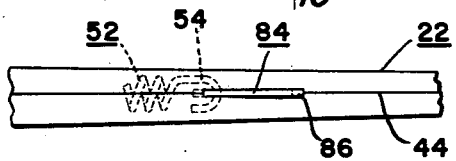
FIGURE 10 is a fragmentary view in elevation taken in the direction of arrow 10 of FIGURE 9.

With reference to FIGURES 9 and 10, the outer arm section 22 is formed with a slot within which a hook 84 having an exterior abutment 86 in inserted. The hook 84 is held in assembled relation with the arm by the tension of the spring 52, the end of which 54 is engaged with the hook 84.

While the embodiments of the invention as herein disclosed constitutes preferred forms, it is to be understood that other forms might be adopted.

What is claimed is as follows:

1. A windshield wiper arm including, a mounting section adapted for attachment to a drive shaft, an elongate blade carrying section comprising an elongate, hollow, seam welded tube having its inner end pivotally connected to said mounting section and an integral substantially solid outer terminal end of rectangular configuration, and an extension spring disposed wholly within said tube having one end operatively connected to said mounting section and its other end operatively connected to said tube whereby said extension spring tends to rotate said blade carrying section about its pivotal connection with said mounting section.

2. The windshield wiper arm set forth in claim 1 wherein said tube is substantially circular in cross section and has a gradually decreasing diameter from its inner end to a point adjacent its outer terminal end.

References Cited in the file of this patent

UNITED STATES PATENTS

| 1,863,873 | Quarnstrom | June 21, 1932 |
| 2,134,954 | Rappl | Nov. 1, 1938 |
| 2,736,053 | Oishei et al. | Feb. 28, 1956 |
| 2,773,712 | Chambers | Dec. 11, 1956 |
| 2,975,457 | Scinta | Mar. 21, 1961 |

FOREIGN PATENTS

| 1,012,968 | France | Apr. 23, 1952 |